United States Patent
Palcic et al.

(10) Patent No.: US 12,187,419 B2
(45) Date of Patent: Jan. 7, 2025

(54) ROTARY SHAFT FOR AN AIRCRAFT

(71) Applicant: Lockheed Martin Corporation, Bethesda, MD (US)

(72) Inventors: Peter X. Palcic, Bethany, CT (US); Cole Steven Twing, Castle Pines, CO (US); Yuriy Gmirya, Woodbridge, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 205 days.

(21) Appl. No.: 17/895,703

(22) Filed: Aug. 25, 2022

(65) Prior Publication Data
US 2024/0067332 A1    Feb. 29, 2024

(51) Int. Cl.
| | |
|---|---|
| *B64C 27/10* | (2023.01) |
| *B64C 27/14* | (2006.01) |
| *B64C 27/26* | (2006.01) |
| *B64C 27/82* | (2006.01) |

(52) U.S. Cl.
CPC .............. *B64C 27/10* (2013.01); *B64C 27/14* (2013.01); *B64C 27/26* (2013.01); *B64C 2027/8236* (2013.01); *B64C 2027/8272* (2013.01); *B64C 2027/8281* (2013.01)

(58) Field of Classification Search
CPC ....... B64C 27/14; B64C 27/006; B64C 27/12; F16C 3/023; F16D 9/06
See application file for complete search history.

(56) References Cited

U.S. PATENT DOCUMENTS

| | | | |
|---|---|---|---|
| 4,276,758 A * | 7/1981 | Coman | F16D 3/72 |
| | | | 464/99 |
| 6,361,451 B1 | 3/2002 | Masters et al. | |
| 6,676,526 B1 | 1/2004 | Poster | |
| 6,827,370 B2 * | 12/2004 | Haramati | A63C 11/22 |
| | | | 280/821 |
| 10,316,895 B2 * | 6/2019 | McMillan | F16D 3/56 |
| 10,337,261 B2 * | 7/2019 | Maw | E21B 4/006 |
| 10,344,806 B2 | 7/2019 | Rix | |
| 2004/0097293 A1 | 5/2004 | Poster | |
| 2006/0178060 A1 * | 8/2006 | Wada | F16C 3/026 |
| | | | 440/83 |

(Continued)

FOREIGN PATENT DOCUMENTS

| | | |
|---|---|---|
| EP | 1599372 B1 | 6/2012 |
| GB | 2511180 A | 8/2014 |

OTHER PUBLICATIONS

European Extended Search Report for Application No. 23188877, dated Dec. 5, 2023 (9 pages).

*Primary Examiner* — Joshua J Michener
*Assistant Examiner* — Cindi M Curry
(74) *Attorney, Agent, or Firm* — Michael Best & Friedrich LLP

(57) ABSTRACT

A rotary shaft assembly includes a rotary shaft having a first end portion, a second end portion opposite the first end portion, a longitudinal axis extending centrally through the first and second end portions, and a shaft body that defines a bore between the first and second end portions. An anti-flailing mechanism is positioned within the bore of the shaft body. The anti-flailing mechanism is coupled to rotary shaft and extends at least partially between the first and second end portions to contain the rotary shaft about the longitudinal axis when the rotary shaft fails.

18 Claims, 7 Drawing Sheets

(56) References Cited

U.S. PATENT DOCUMENTS

| | | |
|---|---|---|
| 2009/0179428 A1 | 7/2009 | Achenbach |
| 2015/0184700 A1* | 7/2015 | Balsiger .................... F16H 3/22 |
| | | 74/405 |
| 2015/0275959 A1* | 10/2015 | Gabrys ................... F16C 3/023 |
| | | 156/60 |
| 2019/0234313 A1* | 8/2019 | Kray ....................... B22F 10/28 |
| 2022/0299055 A1* | 9/2022 | Tenne .................. B23K 33/006 |

* cited by examiner

ROTARY SHAFT FOR AN AIRCRAFT

STATEMENT OF FEDERAL SUPPORT

This invention was made with government support under W911W6-19-9-0005 awarded by the Army. The government has certain rights in the invention.

FIELD OF INVENTION

Embodiments described herein relate to a rotary shaft assembly and, in particular, to a rotary shaft assembly having an anti-flailing mechanism.

BACKGROUND

A dual, rotary wing aircraft generally includes an airframe with an extending tail. A dual, counter rotating, coaxial main rotor assembly is located at the airframe and rotates about a main rotor axis. The main rotor assembly includes an upper rotor assembly driven in a first direction (e.g., counter-clockwise) about the main rotor axis and a lower rotor assembly driven in a second direction about the main rotor axis opposite to the first direction (i.e., counter rotating rotors). Each of the upper rotor assembly and the lower rotor assembly includes a plurality of rotor blades secured to a rotor hub. The aircraft may further include a translational thrust system located at the extending tail to provide translational thrust (forward or rearward). The aircraft may further include secondary drive assemblies such as propeller drive assemblies, oil drive assemblies, accessory drive assembly or the like.

SUMMARY

Embodiments described herein provide a rotary shaft assembly. The rotary shaft assembly including a rotary shaft having a first end portion, a second end portion opposite the first end portion, a longitudinal axis extending centrally through the first and second end portions, and a shaft body that defines a bore between the first and second end portions. An anti-flailing mechanism positioned within the bore of the shaft body, the anti-flailing mechanism coupled to rotary shaft and extending at least partially between the first and second end portions to contain the rotary shaft about the longitudinal axis when the rotary shaft fails.

Embodiments described herein provide an aircraft including an airframe with an extending tail, an engine supported by the airframe, and a main rotary assembly located at the airframe. The main rotor assembly having a primary rotary shaft that is rotatably about a main rotor axis by the engine. A secondary rotary shaft assembly configured to drive a secondary drive assembly. The secondary rotary shaft assembly including a secondary rotary shaft having a first end portion, a second end portion opposite the first end portion, a longitudinal axis extending centrally through the first and second end portions, and a shaft body that defines a bore between the first and second end portions. An anti-flailing mechanism positioned within the bore of the shaft body, the anti-flailing mechanism coupled to the secondary rotary shaft and extending between the first and second end portions to contain the secondary shaft about the longitudinal axis when the shaft fails.

Embodiments described herein provide a method of assembling a rotary shaft assembly. The method including providing a rotary shaft having a first end portion, a second end portion opposite the first end portion, a longitudinal axis extending centrally through the first and second end portions, and a shaft body that defines a bore between the first and second end portions and inserting an anti-flailing mechanism within the bore of the shaft body. The anti-flailing mechanism configured to contain the rotary shaft about the longitudinal axis when the rotary shaft fails. Coupling a first end of the anti-flailing mechanism to the rotary shaft proximate the first end portion and coupling a second end of the anti-flailing mechanism to the rotary shaft proximate the second end portion Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
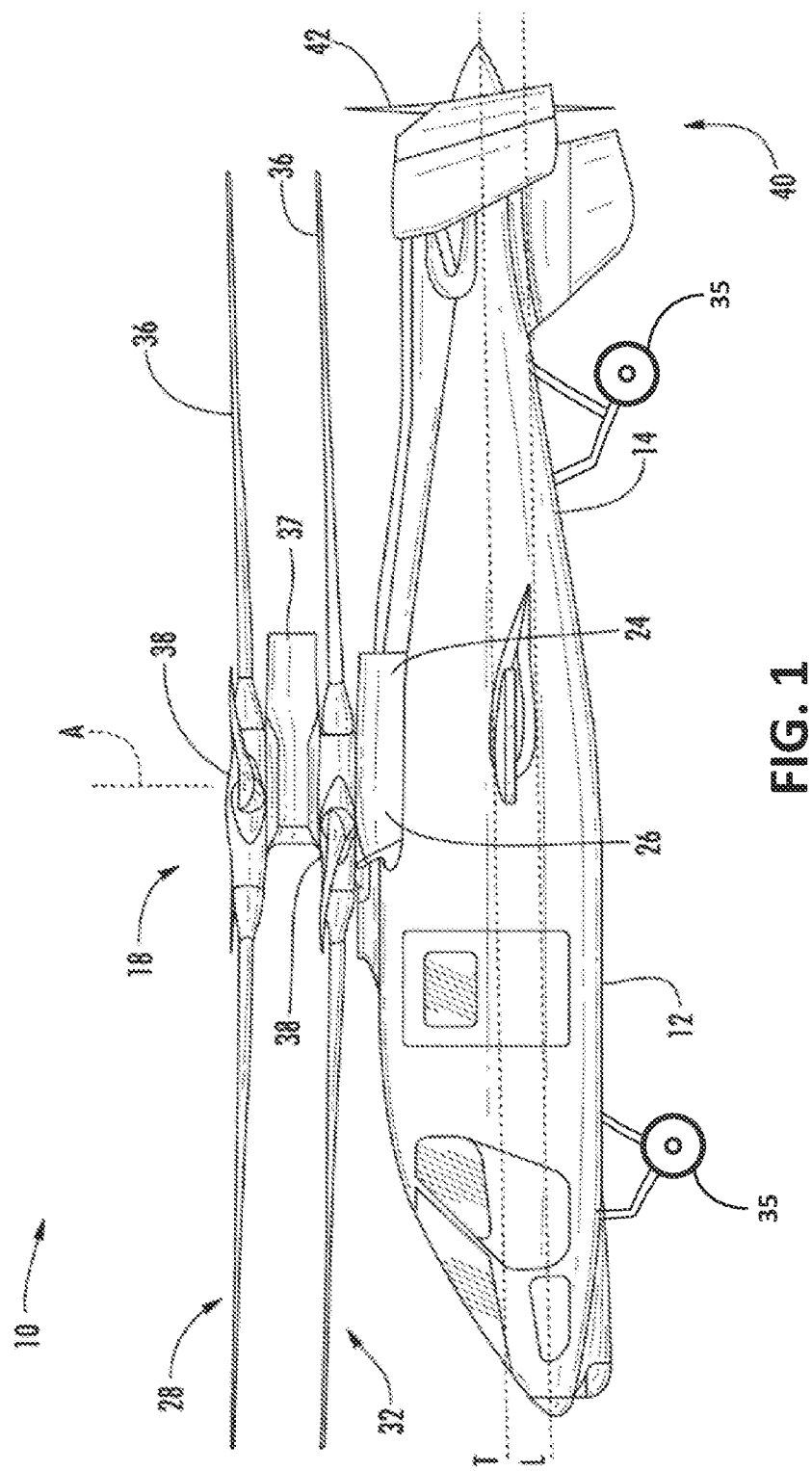
FIG. 1 depicts a rotary wing aircraft according to an exemplary embodiment.
Figure 2:
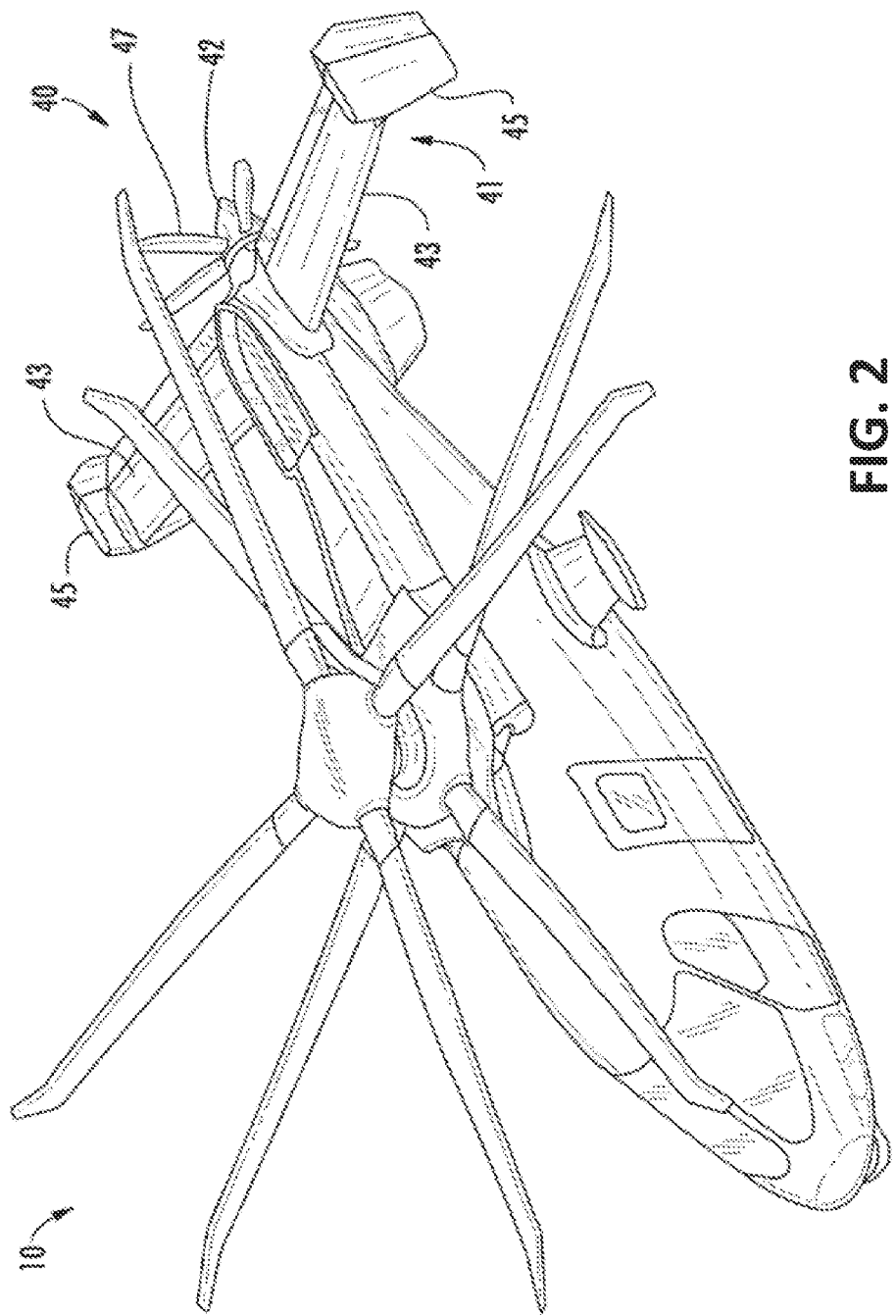
FIG. 2 depicts a perspective view of the rotary wing aircraft of FIG. 1.

FIGS. 1 and 2 depict an embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. The main rotor assembly 18 is driven by a power source, for example, one or more engines 24 via a gearbox 26. In some embodiments, the aircraft 10 further includes a translational thrust system 40 located at the extending tail 14 to provide translational thrust (forward or rearward) for the aircraft 10. Translational thrust system 40 includes a propeller 42 and is positioned at a tail section 41 of the aircraft 10. Additionally, the aircraft 10 may include landing gear assemblies 35 extending from below the airframe 12. The illustrated aircraft 10 includes two front landing gear assemblies 35 (right landing gear not shown in FIG. 1) and a rear landing gear assembly 35. In some embodiments, the landing gear assemblies 35 may be retractable.

The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. Any number of blades 36 may be used with the rotor assembly 18. The rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments. Although, the dual rotor system is depicted as coaxial, embodiments include dual rotor aircraft having non-coaxial rotors, including single rotor rotary aircraft which use a tail rotor.

Figure 3:
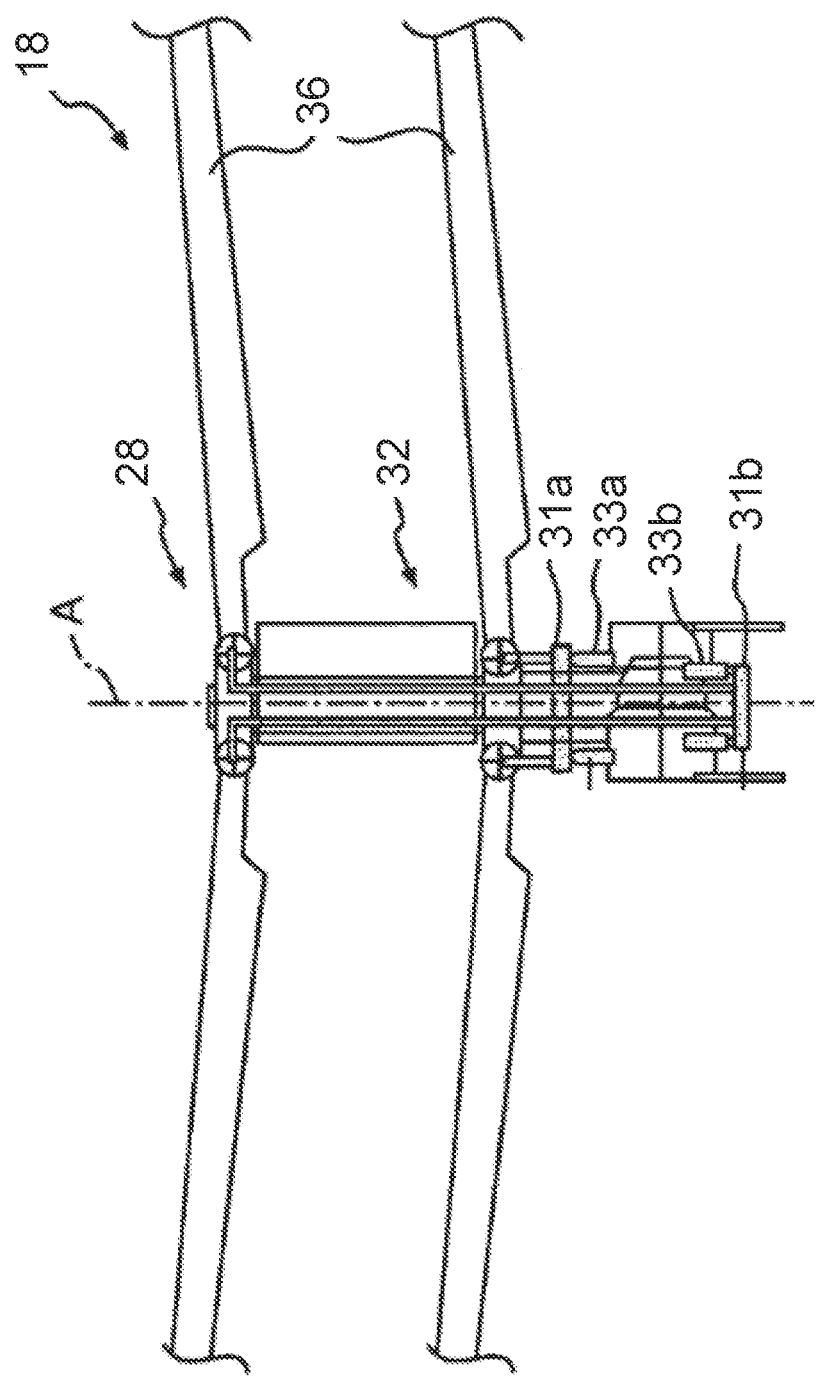
FIG. 3 is a schematic illustration of a rotor assembly for a rotary wing aircraft according to an exemplary embodiment.

Referring to FIG. 3, the upper rotor assembly 28 and the lower rotor assembly 32 may be independently controlled through a separate swashplate assembly 31*a*, 31*b*, which selectively articulates the upper rotor assembly 28 and the lower rotor assembly 32. Generally, motion of the swashplate assemblies 31*a*, 31*b* along the rotor axis A (i.e., translating along axis A) will cause the rotor blades 36 of the upper rotor assembly 28 and the lower rotor assembly 32 to vary pitch collectively. Tilting of the swashplate assemblies 31*a*, 31*b* with respect to the axis A will cause the rotor blades 36 to vary pitch cyclically and tilt the rotor disk. The swashplate assemblies 31*a*, 31*b* translate and/or tilt by a separate servo mechanism 33*a*, 33*b*, which selectively articulates the upper rotor assembly 28 and the lower rotor assembly 32 independently in both cyclic and collective in response to a command from a flight control computer.

Referring back to FIG. 1, the translational thrust system 40 includes a propeller 42 with blades 47. In exemplary embodiments, the pitch of propeller blades 47 may be altered to change the direction of thrust (e.g., forward or rearward). The tail section 41 includes active elevators 43 and active rudders 45 as controllable surfaces. The propeller 42 is connected to and driven by the engine(s) 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of the propeller 42. While shown in the context of a pusher-prop configuration, it is understood that the propeller 42 could also be a more conventional puller prop or could be variably facing so as to provide yaw control in addition to or instead of translational thrust. It should also be understood that any such system or other translational thrust systems may alternatively or additionally be utilized. Alternative translational thrust systems may include different propulsion forms, such as a jet engine.

Figure 4:
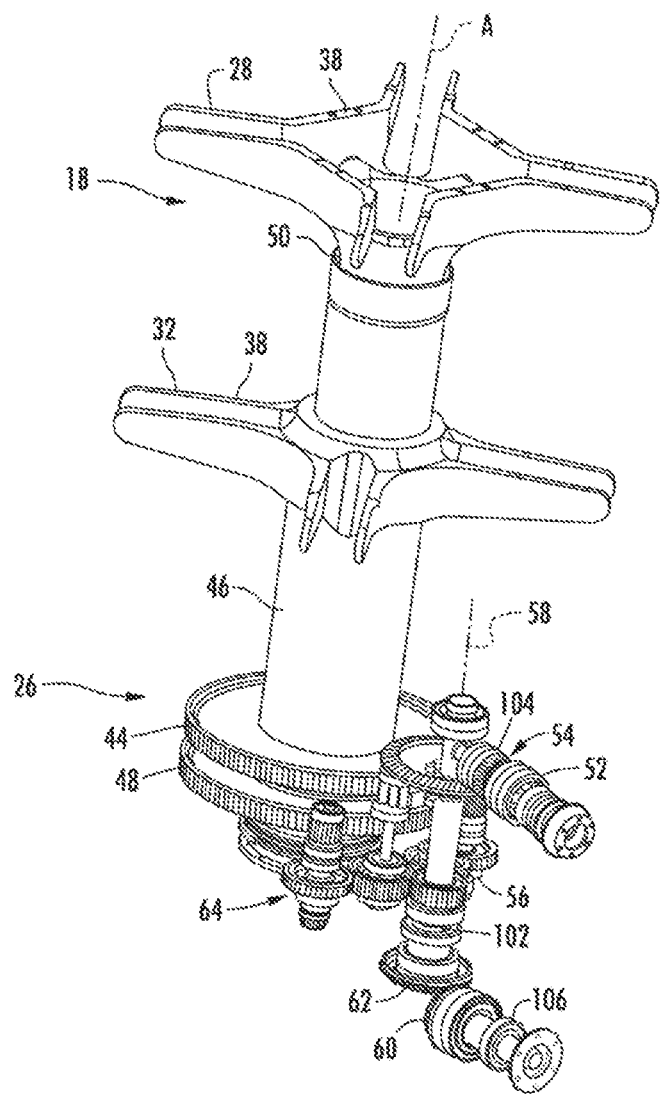
FIG. 4 is a perspective view of a gear train for a rotary wing aircraft according to an exemplary embodiment.

Shown in FIG. 4 is a perspective view of portions of an exemplary embodiment of the main rotor assembly 18 and the gearbox 26. The gearbox 26 includes an upper bull gear 44 that rotates about the main rotor axis, A, and is connected to the lower rotor assembly 32 via a lower rotor shaft 46 extending along the main rotor axis, A. A lower bull gear 48 rotates about the main rotor axis, A, and is connected to the upper rotor assembly 28 via an upper rotor shaft 50 extending along the main rotor axis, A, and through an interior of the lower rotor shaft 46. Torque and rotational speed are provided to the gearbox 26 via an input shaft 52 that transmits the torque and rotational speed from the engine(s) 24 to an input bevel gear 54 disposed at an input bevel shaft 56 of the gearbox 26 via an input bevel pinion 104. In some embodiments, the input bevel shaft 56 rotates about an input bevel shaft axis 58 parallel to the main rotor axis A. The propeller 42 is driven by a propeller output shaft 106 driven by a propeller output gear 62 disposed at a quill shaft 102, or an extension of the input bevel shaft 56. Transfer from the propeller output gear 62 is achieved via connection with a propeller output pinion 60 at the propeller output shaft 106. To transfer torque from the input bevel shaft 56 to the lower rotor assembly 32 and the upper rotor assembly 30, the gearbox 26 includes a torque split gear reduction stage 64. While shown with the propeller output shaft 106 driven by the propeller output gear 62, it is understood that such elements could be removed where the propeller 42 is not used or is separately driven.

Figure 5:
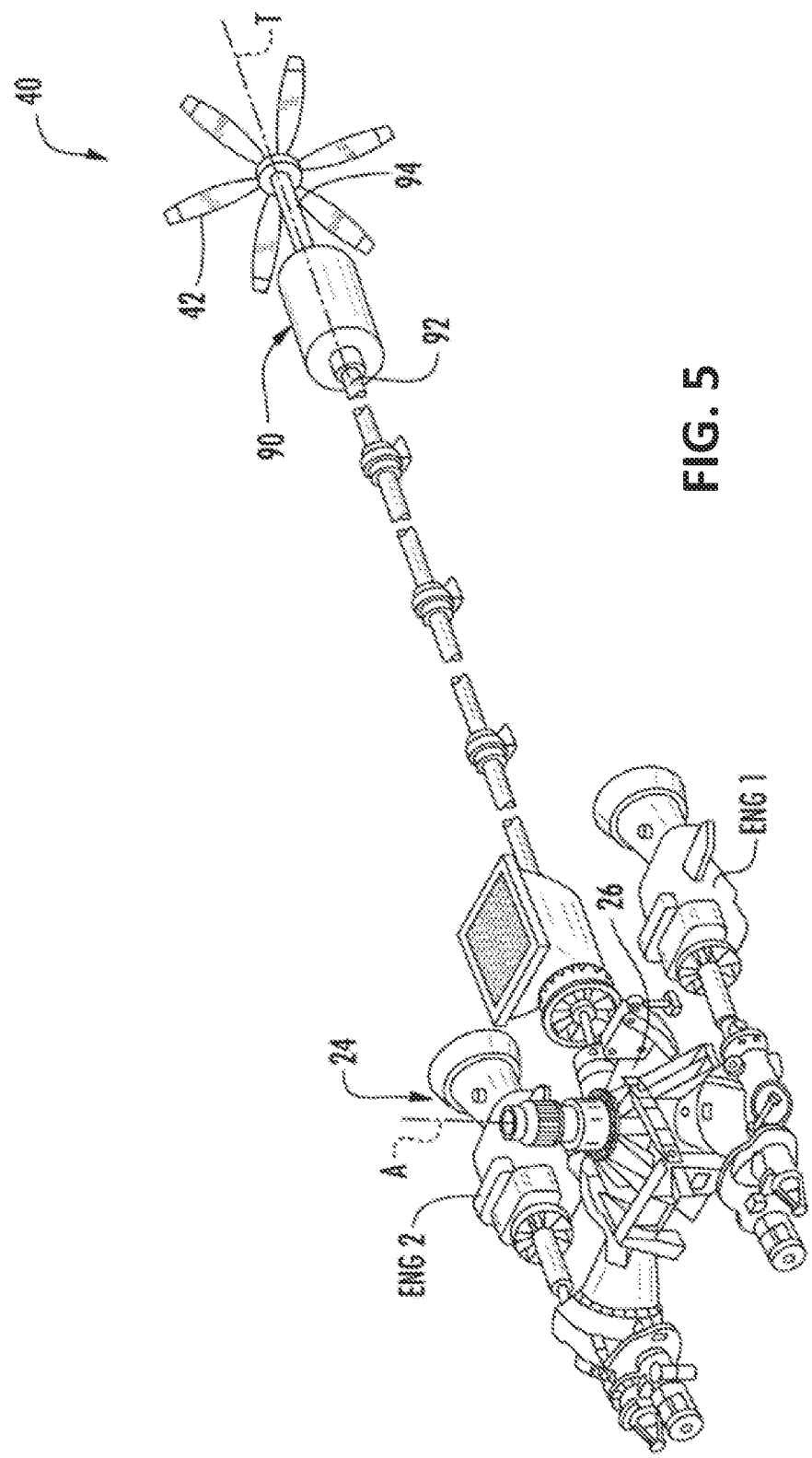
FIG. 5 is a perspective view of a gearbox and translational thrust system according to an exemplary embodiment.

Referring to FIG. 5, another exemplary embodiment of the main rotor assembly 18 is driven about the axis of rotation, A, through a main gearbox (MGB) 26 by a multi-engine powerplant system 24, having two engine packages ENG1, ENG2 in the example in FIG. 4. The multi-engine powerplant system 24 generates the power available for flight operations and couples such power to the main rotor assembly 18 and the translational thrust system 40 through the MGB 26. The MGB 26 may be interposed between the powerplant system 24, the main rotor assembly 18 and the translational thrust system 40. A portion of the drive system downstream of the MGB 26 includes a combined gearbox 90 (also referred to as a clutch). The combined gearbox 90 selectively operates as a clutch and a brake for operation of the translational thrust system 40 with the MGB 26. The combined gearbox 90 also operates to provide a rotor brake function for the main rotor assembly 18. Although a particular aircraft configuration is illustrated in this non-limiting embodiment shown in FIG. 5, other rotary-wing aircraft will also benefit from embodiments, including single engine aircraft.

The combined gearbox 90 generally includes an input 92 (e.g., a first propeller shaft) and an output 94 (e.g., a second propeller shaft) generally defined along an axis parallel to a rotational axis, T. The input 92 is generally upstream of the combined gearbox 90 relative the MGB 26 and the output 94 is downstream of the combined gearbox 90 and upstream of the pusher propeller system 40. The combined gearbox 90 may be categorized by the technique used to disengage-engage (e.g., clutch) or stop (e.g., brake) the load such as friction, electromagnetic, mechanical lockup, etc., and by the method used to actuate, such as mechanical, electric, pneumatic, hydraulic, self-activating, etc. It should be understood that various combined gearbox 90 systems may be utilized to include, but not to be limited to mechanical, electrically, hydraulic and various combinations thereof.

During operation of the aircraft 10, rotary shafts assemblies that are not required for primary drive (e.g., such as the propeller input shaft 92, the propeller output shaft 94, accessory rotary shafts, oil rotary shafts, or the like) may fail due to mechanical damage or structural damage (e.g., from ballistics or the like) to the rotary shaft. Therefore, it should be appreciated that drive assemblies not required for primary drive are referenced to herein as a secondary drive assembly.

Figure 6:
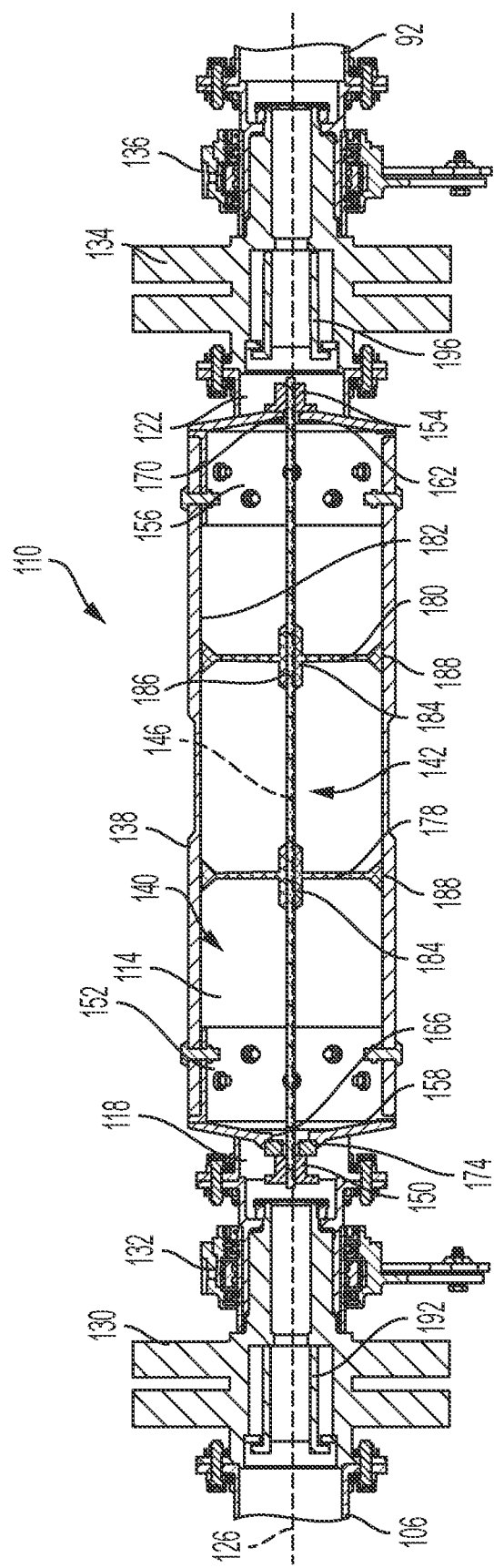
FIG. 6 is a cross sectional view of a rotary shaft assembly according to a first exemplary embodiment.

FIG. 6 illustrates a rotary shaft assembly 110 for a secondary drive assembly. The rotary shaft assembly 110 includes a shaft 114 having a first end portion 118, a second end portion 122 opposite the first end portion 118, and a longitudinal axis 126 extending centrally through the first and second end portions 118, 122. In the illustrated embodiment, the secondary drive assembly 110 at least partially defines the propeller input shaft 92. In other embodiments, the rotary shaft assembly 110 may define at least a portion of other secondary drive assemblies such as an accessory drive assembly, an oil drive assembly or the like.

The first end portion 118 of the shaft 114 is coupled to a first coupling 130, which is coupled to the propeller output shaft 106. The second end portion 122 of the shaft 114 is coupled to a second coupling 134, which is coupled to the propeller input shaft 92 to couple the rotary shaft assembly 110 to the gearbox 90 (FIG. 5). In other embodiments, the first and second couplings 130, 134 may be coupled to alternative secondary drive assemblies (e.g., accessory drive assemblies, oil drive assemblies, or the like). The rotary shaft assembly 110 further includes a first hanger bearing 132 positioned between the first coupling 130 and the first end portion 118 and a second hanger bearing 136 positioned between the second coupling 134 and the propeller input shaft 92. In other embodiments, the rotary shaft assembly 110 may not include couplings 130, 134 or hanger bearings 132, 136. In such embodiments, the rotary shaft assembly 110 may be used in a direct drive assembly.

The shaft 114 includes a shaft body 138 that defines a bore 140 between the first and second end portions 118, 122. During operation of the aircraft 10, the shaft body 138 of the rotary shaft 114 may be damaged due to an impact (e.g., from ballistics, or the like). When the rotary shaft 114 fails, an anti-flailing mechanism 142, which is positioned within the bore 140 defined by the shaft body 138, contains the shaft 114 about the longitudinal axis 126 to reduce secondary damage to the aircraft 10 or surrounding structures (e.g., in other embodiments). The anti-flailing mechanism 142 is coupled to the shaft 114 and extends at least partially between the first and second end portions 118, 122 of the shaft 114.

Further, while the rotary shaft assembly 110 is discussed in relation to a secondary drive assembly for an aircraft, it should be appreciated that the rotary shaft assembly 110 may be used in other machines or applications. For example, the rotatory shaft assembly 110 may be used in applications where the rotary shaft assembly 110 is adjacent critical components (e.g., main drive assemblies). In such embodiments, a structure surrounding the rotary shaft assembly 110 is not viable because of tight tolerances.

The anti-flailing mechanism 142 includes a cable 146 (e.g., a tension cable) having a first end coupled to the first end portion 118 of the rotary shaft 114 by a first retaining member 150 and a second cable end coupled to the second end portion 122 by a second retaining member 154. In the illustrated embodiment, the first and second end portions 118, 122 are defined by respective first and second end cap portions 152, 156 that are coupled to the shaft 114. The end cap portions 152, 156 each include an inner wall 158, 162 defining an aperture 166, 170 that is coaxial with the longitudinal axis 126 and sized to receive the cable 146. In other embodiments, the anti-flailing mechanism 142 may be coupled to the shaft 114 at a longitudinal position offset from the first and second end portions 118, 122. Further, a bearing 174 may be positioned between the first retaining member 150 and the inner wall 158. In other embodiments, a bearing may be additionally or alternatively positioned between the second retaining member 154 and the inner wall 162.

With continued reference to FIG. 6, the anti-flailing mechanism 142 includes one or more support members 178, 180 coupled to the cable 146 and extending between the tension cable 146 and an internal surface 182 of the shaft 114. In the illustrated embodiment, the anti-flailing mechanism 142 includes a first support member 178 positioned at a first longitudinal position between the first and second end portions 118, 122 and a second support member 180 positioned at a second longitudinal position between the first and second end portions 118, 122, which is offset from the first longitudinal position. In other embodiments, the anti-flailing mechanism 142 may include less (e.g., one) or more (e.g., three, four, etc.) support members.

Each support member 178, 180 is formed as a circumferential disk having a hub portion 184 defining a channel 186 that receives the cable 146 and an outer surface 188 in communication with the internal surface 182 of the shaft body 138. When the shaft 114 fails, the support members 178, 180 are configured to support the inner surface 182 of the shaft 114, which ensures the shaft 114 is contained about the longitudinal axis 126. Further, the first and second couplings 130, 134 include first and second axial limiters 192, 196 that restrict movement (e.g., along the longitudinal axis 126) of the components of the rotary shaft assembly 110.

During assembly of the shaft assembly 110, the shaft 114 having the first end portion 118 and the second end portion 122 opposite the first end portion 118 is provided. In the illustrated embodiment, the first and second end portions 118, 122 are defined by end cap portions 152, 156. One or both of the end cap portions 118, 122 may be uncoupled from the shaft body 138, so the anti-flailing mechanism 142 can be inserted within the bore 140. In some embodiments, the components (e.g., the cable 146 and the support members 178, 180) of the anti-flailing mechanism 142 may be assembled prior to the anti-flailing mechanism 142 being inserted within the bore 140 of the shaft body 138. In other words, the support members 178, 180 may be coupled to the cable 146 at first and second longitudinal positions and then the cable 146 and the support members 178, 180 may be inserted within the bore 140 of the shaft body 138. In other embodiments, the support members 178, 180 may be inserted within the bore 140 of the shaft body 138 at the first and second longitudinal positions. Then the cable 146 may be inserted into the bore 140 through the channel 186 defined in the hub portion 184 of the support members 178, 180.

The first end of the anti-flailing mechanism 142 is coupled to the shaft 114 proximate the first end portion 118 of the shaft 114. In the illustrated embodiment, a first end cap portion 152 is coupled to the shaft body 138 to define the first end portion 118 of the shaft 114. To couple the anti-flailing mechanism 142 to the shaft 114, the first end of the cable 146 is inserted through the first aperture 166 defined in the first inner wall 158 of the first end cap portion 152 and the second end of the cable 146 is inserted through the second aperture 170 defined in the second inner wall 162 of the second end cap portion 156. The first end of the cable 146 is coupled to the first inner wall 158 by the first retaining member 150. In some embodiments, the bearing 174 is positioned between the first inner wall 158 and the retainer 150. In some embodiments, when the first end of the cable 146 is inserted through the first aperture 166, the first end cap portion 152 may be coupled to the shaft body 138, while the second end cap portion 156 is not coupled to the shaft body 138 which provides access to the bore 140. The second end of the cable 146 is then inserted through the second aperture 170 and secured to the second inner wall 162 by the second retaining member 154. In some embodiments, the second end cap portion 156 is coupled to the shaft body 138 to define the second end portion 122 of the shaft 114 after the second end of the cable 146 is inserted through the second aperture 170. The first and second retaining members 150, 154 may be tightened to pull the cable 146 taut between the first and second end portions 118, 122 of the shaft 114.

Figure 7:
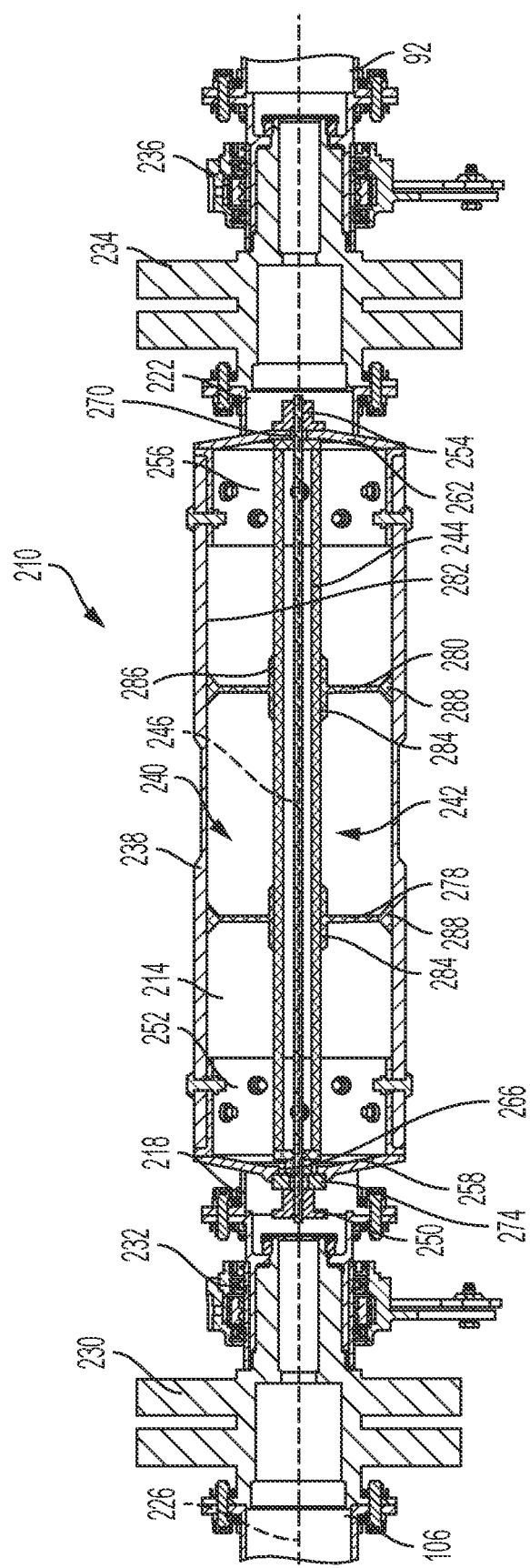
FIG. 7 is a cross sectional view of a rotary shaft assembly according to a second exemplary embodiment.

FIG. 7 illustrates a second embodiment of a rotary shaft assembly 210 for a secondary drive assembly, with like components and features as the embodiment of the rotary shaft assembly 110 shown in FIG. 6 being labeled with like reference numerals plus "100". The rotary shaft assembly 110 is utilized for a secondary drive assembly in an aircraft similar to the aircraft 10 of FIGS. 1-5 and, accordingly, the discussion of the aircraft 10 above similarly applies to the rotary shaft assembly 210 and is not re-stated. Rather, only differences between the rotary shaft assembly 110 of FIG. 6 and the rotary shaft assembly 210 of FIG. 7 are specifically noted herein. In addition, it should be appreciated that the rotary shaft assembly 210 may be used in other machines or applications.

The shaft assembly 210 includes a shaft 214 having a first end portion 218, a second end portion 222 opposite the first end portion 218, a longitudinal axis 226 extending centrally through the first and second end portions 218, 222. The first end portion 218 of the shaft 214 is coupled to a first coupling 230, which is coupled to the propeller output shaft 106. The second end portion 222 of the shaft 214 is coupled to a second coupling 234, which is coupled to the propeller input shaft 92 to couple the rotary shaft assembly 210 to the gearbox 90 (FIG. 5). In other embodiments, the first and second couplings 230, 234 may be coupled to alternative secondary drive assemblies (e.g., accessory drives, oil drives, or the like). The rotary shaft assembly 210 further includes a first hanger bearing 232 positioned between the first coupling 230 and the first end portion 218 and a second hanger bearing 236 positioned between the second coupling 234 and the propeller input shaft 92. In other embodiments, the rotary shaft assembly 210 may not include couplings 230, 234 or hanger bearings 132, 136. In such embodiments, the rotary shaft assembly 210 may be used in a direct drive assembly.

The shaft 214 includes a shaft body 238 that defines a bore 240 between the first and second end portions 218, 222. When the rotary shaft 214 fails, an anti-flailing mechanism 242, which is positioned within the bore 240 defined by the shaft body 238, contains the shaft 214 about the longitudinal axis 226 to reduce secondary damage to the aircraft 10. The anti-flailing mechanism 242 is coupled to the shaft 214 and extends at least partially between the first and second end portions 218, 222 of the shaft 214.

The anti-flailing mechanism 242 includes a support tube 244 positioned within the shaft 214 and extending between the first and second end portions 218, 222. In the illustrated embodiment, the support tube 244 acts as an axial limiter and is configured to restrict movement of the components of the rotary shaft assembly 210. A cable 246 is positioned within the support tube 244 and includes a first end coupled to the first end portion 218 of the rotary shaft 214 via a first retaining member 250 and a second cable end coupled to the second end portion 222 via a second retaining member 254. The support tube 244 provides protection for the cable 246 during impacts on the shaft 214. For example, the support tube 244 may be formed of a material that is ballistic resistant to reduce direct impacts to the cable 246. The support tube 244 also maintains tension on the cable 246 in a case where the shaft body 238 is damaged. For example, if the shaft body 238 is damaged such that material is missing from the shaft body 238, the tension of the cable 246 would tend to collapse the shaft body 238. In this case, the tension in the cable 246 would be lost and, thus, allow the shaft body 238 to flail more until that tension is regained. By incorporating the support tube 244, the tension is maintained with respect to the first and second end portions 218, 222 of the shaft body 238, which acts as the secondary structure to reduce flailing of the shaft body 238.

In the illustrated embodiment, the first and second end portions 218, 222 are defined by respective first and second end cap portions 252, 256 that are coupled to the shaft body 238. The end cap portions 252, 256 each include an inner wall 258, 262 defining an aperture 266, 270 that is coaxial with the longitudinal axis 226 and sized to receive the cable 246. The apertures 266, 270 may also be sized to receive a portion of the support tube 244 to support the support tube 244 within the shaft 214. Further, a bearing 274 may be positioned between the first retaining member 250 and the inner wall 258.

With continued reference to FIG. 7, the anti-flailing mechanism 242 includes one or more support members 278, 280 coupled to the support tube 244 and extending between the support tube 244 and an internal surface 282 of the shaft 214. In the illustrated embodiment, the anti-flailing mechanism 242 includes a first support member 278 positioned at a first longitudinal position between the first and second end portions 218, 222 and a second support member 280 positioned at a second longitudinal position between the first and second end portions 218, 222, which is offset the first longitudinal position. In other embodiments, the anti-flailing mechanism 142 may include less (e.g., one) or more (e.g., three, four, etc.) support members.

Each support member 278, 280 is formed as a circumferential disk having a hub portion 284 defining a channel 286 sized to receive the support tube 244 and an outer surface 288 in communication with the internal surface 282 of the shaft body 238. When the shaft 214 fails, the support members 278, 280 are configured to support the inner surface 282 of the shaft 214, which ensures the shaft 214 is contained about the longitudinal axis 226.

During assembly of the shaft assembly 210, the shaft 214 having the first end portion 218 and the second end portion 222 opposite the first end portion 218 is provided. In the illustrated embodiment, the first and second end portions 218, 222 are defined by end cap portions 252, 256. One or both of the end cap portions 218, 222 may be uncoupled from the shaft body 238, so the anti-flailing mechanism 242 can be inserted within the bore 240. In some embodiment, the components (e.g., the cable 246, the support tube 244, and the support members 178, 180) of the anti-flailing mechanism 242 may be assembled prior to the anti-flailing mechanism 242 being inserted within the bore 240 defined by shaft body 238. In other words, the support members 278, 280 may be coupled to the support tube 244 at first and second longitudinal positions, the cable may be inserted within the support tube 244, and then the support tube 244, the cable 246, and the support members 278, 280 may be inserted within the bore 240 of the shaft body 238. In other embodiments, the support members 278, 280 may be inserted within the bore 240 of the shaft body 238, the support tube 244 may be inserted into the bore 240 through the channel 286 defined in the hub portion 284 of the support members 278, 280, and then the cable 246 may be inserted within the support tube 244.

The first end of the anti-flailing mechanism 242 is coupled to the shaft 214 proximate the first end portion of the shaft 214. In the illustrated embodiment, a first end cap portion 252 is coupled to the shaft body 238 to define the first end portion 218 of the shaft 214. To couple the anti-flailing mechanism 242 to the shaft 214, the support tube 244 is supported by the first aperture 266 defined in the first inner wall 258 of the first end cap portion 252. The first end of the cable 246 is inserted within the support tube 244 and is inserted through the first aperture 266 defined in the first end cap portion 252. The first end of the cable 246 is coupled to the first inner wall 258 by the first retaining member 250. In some embodiments, the bearing 274 is positioned between the first inner wall 258 and the retainer 250. In some embodiments, when the first end of the cable 246 is inserted through the first aperture 266, the first end cap portion 252 may be coupled to the shaft body 238, while the second end cap portion 256 is not coupled to the shaft body 238 which provides access to the bore 240. The second end of the cable 246 is then inserted through the second aperture 270 formed in the second end cap portion 256 and secured to the second inner wall 262 by the second retaining member 254. In some embodiments, the second end cap portion 256 is coupled to the shaft body 238 to define the second end portion 222 of the shaft 214 after the second end of the cable 246 is inserted through the second aperture 270. In addition, coupling the second end cap portion 256 to the shaft body 238 secures the support tube 244 between the first and second end cap portions 252, 256. The first and second retaining members 250, 254 may be tightened to pull the cable 246 taut between the first and second end portions 218, 222 of the shaft 214.

Various features and advantages of the embodiments described herein are set forth in the following claims.

What is claimed is:

1. A rotary shaft assembly comprising:
a rotary shaft having a first end portion, a second end portion opposite the first end portion, a longitudinal axis extending centrally through the first and second end portions, and a shaft body that defines a bore between the first and second end portions,
an anti-flailing mechanism positioned within the bore of the shaft body, the anti-flailing mechanism having a cable coupled to the rotary shaft and extending at least partially between the first and second end portions to contain the rotary shaft about the longitudinal axis when the rotary shaft fails, and
a support tube positioned within the bore of the shaft body and extending between the first and second end portions,
wherein the cable is positioned within the support tube.

2. The rotary shaft assembly of claim 1, wherein the cable has a first cable end coupled to the first end portion of the rotary shaft and a second cable end coupled to the second end portion of the rotary shaft.

3. The rotary shaft assembly of claim 2, wherein the first and second end portions of the rotary shaft are respectively defined by a first end cap portion and a second end cap portion that are coupled to the shaft, and wherein each end cap portion includes an inner wall defining an aperture that is coaxial with the longitudinal axis and sized to receive the cable.

4. The rotary shaft assembly of claim 3, wherein the first end of the cable is coupled to the first end cap portion by a first retaining member and the second end of the cable is coupled to the second end cap portion by a second retaining member.

5. The rotary shaft assembly of claim 2, wherein the anti-flailing mechanism includes at least one support member coupled to the cable and extending between the cable and an internal surface of the shaft body.

6. The rotary shaft assembly of claim 5, wherein the at least one support member is a circumferential disk having a hub portion defining a channel that receives the cable and an outer surface in communication with the internal surface of the shaft body.

7. The rotary shaft assembly of claim 5, wherein the at least one support member includes a first support member positioned at a first longitudinal position between the first and second end portions and a second support member positioned at a second longitudinal position between the first and second end portions.

8. The rotary shaft assembly of claim 2, wherein the anti-flailing mechanism includes at least one support member coupled to the support tube and extending between the cable and an internal surface of the shaft body.

9. The rotary shaft assembly of claim 8, wherein the at least one support member is a circumferential disk having a hub portion defining a channel that receives the support tube and an outer surface in communication with the internal surface of the shaft body.

10. The rotary shaft assembly of claim 9, wherein the at least one support member includes a first support member positioned at a first longitudinal position between the first and second end portions and a second support member positioned at a second longitudinal position between the first and second end portions.

11. An aircraft comprising:
an airframe with an extending tail;
an engine supported by the airframe;
a main rotor assembly located at the airframe, the main rotor assembly having a primary rotor shaft that is rotatably driven about a main rotor axis by the engine; and
a secondary rotary shaft assembly configured to drive a secondary drive assembly by the engine, the secondary rotary shaft assembly including:
a secondary rotary shaft having a first end portion, a second end portion opposite the first end portion, a longitudinal axis extending centrally through the first and second end portions, and a shaft body that defines a bore between the first and second end portions, and
an anti-flailing mechanism positioned within the bore of the shaft body, the anti-flailing mechanism having a cable coupled to the secondary rotary shaft and extending between the first and second end portions,
wherein the anti-flailing mechanism includes one or more support members coupled to the cable, the one or more support members extend from the cable and engage an internal surface of the shaft body offset the cable,
wherein the one or more support members are configured to support the internal surface of the secondary shaft to contain the secondary shaft about the longitudinal axis when the secondary rotary shaft fails.

12. The aircraft of claim 11, wherein the cable has a first cable end coupled to the first end portion of the rotary shaft and a second cable end coupled to the second end portion of the secondary rotary shaft.

13. The aircraft of claim 12, wherein the first cable end is coupled to the first end portion by a first retaining member and the second cable end is coupled to the second end portion by a second retaining member.

14. The aircraft of claim 12, wherein the one or more support members are circumferential disks having a hub portion defining a channel that receives the cable and an outer surface in communication with the internal surface of the shaft body.

15. The aircraft of claim 12, wherein the one or more support members includes a first support member positioned at a first longitudinal positioned between the first and second end portions and a second support member positioned at a second longitudinal position between the first and second end portions.

16. A method of assembling a rotary shaft assembly having a rotary shaft having a first end portion, a second end portion opposite the first end portion, a longitudinal axis extending centrally through the first and second end portions, and a shaft body that defines a bore between the first and second end portions, the method comprising:
   inserting an anti-flailing mechanism within the bore of the shaft body, the anti-flailing mechanism configured to contain the rotary shaft about the longitudinal axis when the rotary shaft fails;
   coupling a first end of the anti-flailing mechanism to the rotary shaft proximate the first end portion;
   coupling a second end of the anti-flailing mechanism to the rotary shaft proximate the second end portion;
   coupling a first end cap portion to the shaft body to define the first end portion; and
   inserting a first end of a cable through a first aperture formed in the first end cap portion.

17. The method of claim 16, further comprising
   securing the first end of the cable to the first end portion by a first retaining member
   inserting a second end of the cable through a second aperture defined in a second end cap portion,
   securing the second end of the cable to the second end portion by a second retaining member, and
   coupling the second end cap portion to the shaft body to define the second end portion of the shaft.

18. The method of claim 17, further comprising coupling one or more support members to the cable prior to coupling the second cap portion to the shaft body so the one or more support members extend between the cable and an internal surface of the shaft body.

* * * * *